US008301618B2

(12) United States Patent
Allard

(10) Patent No.: US 8,301,618 B2
(45) Date of Patent: Oct. 30, 2012

(54) TECHNIQUES TO CONSUME CONTENT AND METADATA

(75) Inventor: James E. Allard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 12/037,899

(22) Filed: Feb. 26, 2008

(65) Prior Publication Data

US 2009/0216745 A1    Aug. 27, 2009

(51) Int. Cl.
*G06F 17/30* (2006.01)

(52) U.S. Cl. .................................. 707/712; 707/732

(58) Field of Classification Search .................. 707/712, 707/732

See application file for complete search history.

(56) References Cited

U.S. PATENT DOCUMENTS

| | | | |
|---|---|---|---|
| 5,220,420 A | 6/1993 | Hoarty et al. |
| 6,237,049 B1 | 5/2001 | Ludtke |
| 6,490,000 B1 | 12/2002 | Schaefer |
| 6,510,210 B1 | 1/2003 | Baughan |
| 6,553,345 B1 | 4/2003 | Kuhn et al. |
| 6,650,248 B1 | 11/2003 | O'Donnell et al. |
| 6,741,684 B2 | 5/2004 | Kaars |
| 6,972,680 B2 | 12/2005 | Yui |
| 6,986,148 B2 | 1/2006 | Johnson, Jr. et al. |
| 7,113,776 B2 | 9/2006 | Minear et al. |
| 7,146,632 B2 | 12/2006 | Miller |
| 7,167,639 B2 | 1/2007 | Haddad |
| 7,218,838 B2 | 5/2007 | Ando et al. |
| 7,233,925 B1 | 6/2007 | Grandcolas et al. |
| 7,240,327 B2 | 7/2007 | Singh et al. |
| 2002/0095687 A1 | 7/2002 | Shintani et al. |
| 2002/0133827 A1 | 9/2002 | Newnam et al. |
| 2003/0014496 A1 | 1/2003 | Spencer et al. |
| 2003/0028873 A1 | 2/2003 | Lemmons |
| 2003/0034957 A1 | 2/2003 | Dubil et al. |
| 2003/0039465 A1 | 2/2003 | Bjorgan et al. |
| 2003/0093790 A1 | 5/2003 | Logan et al. |
| 2003/0097664 A1 | 5/2003 | Meyers et al. |
| 2003/0163832 A1 | 8/2003 | Tsuria |
| 2003/0219234 A1 | 11/2003 | Burda |

(Continued)

FOREIGN PATENT DOCUMENTS

CN    1747602    3/2006

(Continued)

OTHER PUBLICATIONS

"Intrinsyc Supports TVcompass on Windows CE Development for WiFi Smart Remote Control", Copyright 2007, Intrinsyc Software International, Inc., pp. 2.

(Continued)

*Primary Examiner* — Phong Nguyen
*Assistant Examiner* — Dennis Myint
(74) *Attorney, Agent, or Firm* — Wolfe-SBMC

(57) ABSTRACT

Content and metadata associated with the content may be provided to a number of users. The content may be displayed on a display device while the metadata may be transmitted to a remote device corresponding to a receiving user. The user may further request desired information or metadata pertaining to the content and the requested information or metadata may be transmitted to the user's remote device. Different users may request different information on the same or different objects being displayed or presented on a display device. Each requesting user may receive requested information on the same or different objects via corresponding remote devices.

27 Claims, 6 Drawing Sheets

U.S. PATENT DOCUMENTS

| | | | |
|---|---|---|---|
| 2004/0187076 | A1 | 9/2004 | Ki et al. |
| 2005/0076393 | A1* | 4/2005 | Sussman ............... 725/137 |
| 2005/0097618 | A1* | 5/2005 | Arling et al. ............ 725/114 |
| 2005/0149987 | A1 | 7/2005 | Boccon-Gibod |
| 2005/0216563 | A1 | 9/2005 | Stewart et al. |
| 2005/0220439 | A1 | 10/2005 | Carton et al. |
| 2005/0245272 | A1 | 11/2005 | Spaur et al. |
| 2006/0063518 | A1 | 3/2006 | Paddon et al. |
| 2006/0080710 | A1 | 4/2006 | Carthern |
| 2006/0136980 | A1 | 6/2006 | Fulcher et al. |
| 2006/0174277 | A1 | 8/2006 | Sezan |
| 2006/0259930 | A1 | 11/2006 | Rothschild |
| 2006/0265731 | A1* | 11/2006 | Matsuda ............... 725/131 |
| 2006/0271980 | A1 | 11/2006 | Mankovitz |
| 2007/0133938 | A1 | 6/2007 | Park |
| 2007/0156847 | A1 | 7/2007 | Berkvens |
| 2007/0282995 | A1 | 12/2007 | Mizuno et al. |
| 2007/0294337 | A1 | 12/2007 | Gaos et al. |
| 2008/0127275 | A1 | 5/2008 | Tang et al. |
| 2008/0201748 | A1 | 8/2008 | Hasek et al. |
| 2008/0208839 | A1* | 8/2008 | Sheshagiri et al. ........... 707/5 |
| 2008/0279453 | A1* | 11/2008 | Candelore ............ 382/176 |
| 2008/0305778 | A1 | 12/2008 | Aaltonen et al. |
| 2008/0320546 | A1* | 12/2008 | Moon et al. ........... 725/136 |
| 2009/0158323 | A1* | 6/2009 | Bober et al. ............. 725/37 |
| 2009/0164904 | A1 | 6/2009 | Horowitz et al. |
| 2009/0214191 | A1 | 8/2009 | Allard |
| 2010/0011050 | A1 | 1/2010 | Allard |
| 2010/0235433 | A1 | 9/2010 | Ansari et al. |

FOREIGN PATENT DOCUMENTS

| | | |
|---|---|---|
| CN | 1777876 | 5/2006 |
| KR | 20040084395 | 10/2004 |
| KR | 100703567 | 3/2007 |
| WO | WO-2005099197 | 10/2005 |

OTHER PUBLICATIONS

"Harmony 880 Advanced Universal Remote (HD Ready)", Copyright 2007, eCOST.com, retrieved at <<http://www.ecost.com/detail.aspx?edp=3018056>> pp. 3.

"Logitech Harmony Advanced Universal Remote Control 885", Copyright 1995-2007 eBay Inc, pp. 6.

Kaowthumrong et al., "Automated Selection of the Active Device in Interactive Multi", Accepted for Publication at Spontaneity Workshop of Ubicomp 2002, pp. 6.

"Microsoft brings Windows Live Messenger to XBox 360", http://blogs.zdnet.com/social/?p=135.

"Developing Device Independent Java Applications with JSR 188", http://www.w3.org/2002/07/DIAT/posn/sun-jsr-188.html.

Brown, Barry et al., "The Television Will Be Revolutionized: Effects of PVRs and Filesharing on Television Watching", Retrieved from http://delivery.acm.org/10.1145/1130000/1124870/p663-brown.pdf?key1=1124870&key2=4845280711&coll=GUIDE&dl=GUIDE&CFID+10800895&CFTOKEN=61667937, Prceeding of the SIGCHI conference on Human Factors in computing systems, ACM 2006,(Apr. 22-27, 2006),pp. 663-666.

Phung, Dan et al., "Autonomic Control for Quality Collaborative Video Viewing", Retrieved from http://www.cs.columbia.edu/techreports/cucs-053-04.pdf, WOSS' 2004, ACM, 2004,5 pages.

"PCT Search Report and Written Opinion", Application No. PCT/US2009/031841, (Sep. 7, 2009),11 pages.

"PCT Search Report and Written Opinion", Application No. PCT/US2009/031821, (Aug. 3, 2009),11 pages.

"Non-Final Office Action", U.S. Appl. No. 12/037,920, (Dec. 22, 2010),14 pages.

"Final Office Action", U.S. Appl. No. 12/037,920, (Jun. 8, 2011),14 pages.

"Advisory Action", U.S. Appl. No. 12/037,907, (Dec. 5, 2011),3 pages.

"Final Office Action", U.S. Appl. No. 12/037,907, (Nov. 4, 2011),18 pages.

"Foreign Office Action", Chinese Application No. 200980106919.6, (Sep. 26, 2011),8 pages.

"Non-Final Office Action", U.S. Appl. No. 12/037,907, (Jul. 28, 2011),16 pages.

"Foreign Office Action", Chinese Application No. 200980106919.6, (May 3, 2012), 14 pages.

"Foreign Office Action", Chinese Application No. 200980107020.6, (Aug. 2, 2012), 16 pages.

Drucker, Steven M., et al., "SmartSkip: Consumer level browsing and skipping of digital video content", In Proceedings of CHI 2002, Available at <http://citeseerx.ist.psu.edu/viewdoc/download?doi=10.1.1.94.7249&rep=rep1&type=pdf>,(Apr. 2002),8 pages.

* cited by examiner

TECHNIQUES TO CONSUME CONTENT AND METADATA

BACKGROUND

Users receive content such as video and audio information in a number of ways. While viewing a video, for example, a user may notice objects or individuals in the video that are of interest, the user may desire further information on various presented objects, and so on. Typically, such information is not readily available to the user. If the video does not contain explicit information on the object of interest, for instance, the user may have to look up the information via different sources. However, a user typically does not wish to interrupt viewing the video to research topics of interest that present themselves on the spur of the moment.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, content may be displayed or presented on a display device to a number of users and metadata corresponding to the content being displayed may be transmitted to a remote device corresponding to one or more of the users. The metadata may be associated with the content. For example, the metadata may describe or characterize aspects or components of the content. In another example, the display device may display the content but does not display the metadata.

In another example, metadata is transmitted to remote device based on preferences of users and/or the user's remote devices. The metadata may be associated with content being displayed or presented to users and may be selected based on the preferences. The preferences may also be stored in storage for subsequent use.

Also, a system is described for displaying content, extracting metadata associated with the content and sending the metadata to a remote device that is separate from the system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Overview

The variety of content that is available to users is ever increasing. For example, a user may watch a television program. The television program may have metadata associated with it, such as to identify actors, directors, and so on. Traditional techniques that were used to provide the content and metadata, however, were often disjointed and/or interfered with the consumption of the content itself.

Techniques are described that relate to consumption of content and metadata. In an implementation, content and metadata are received via a broadcast at a client device, such as through a television program having associated metadata that describes actors, subtitles, and so on that is received by a set-top box. Preferences that correspond to a remote device (e.g., a remote control device of the set-top box) are identified and metadata that corresponds to the identified preferences is output to the remote device. For instance, a remote control device may have a preference to receive subtitle data and that subtitle data may be provided to the remote control device for output, such as on an integrated displayed device. In this way, the output of the subtitle data does not interfere with the output of the content by the set-top box. A variety of other examples are also contemplated, further discussion of which may be found below.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of systems.

Exemplary Environment

Figure 1:
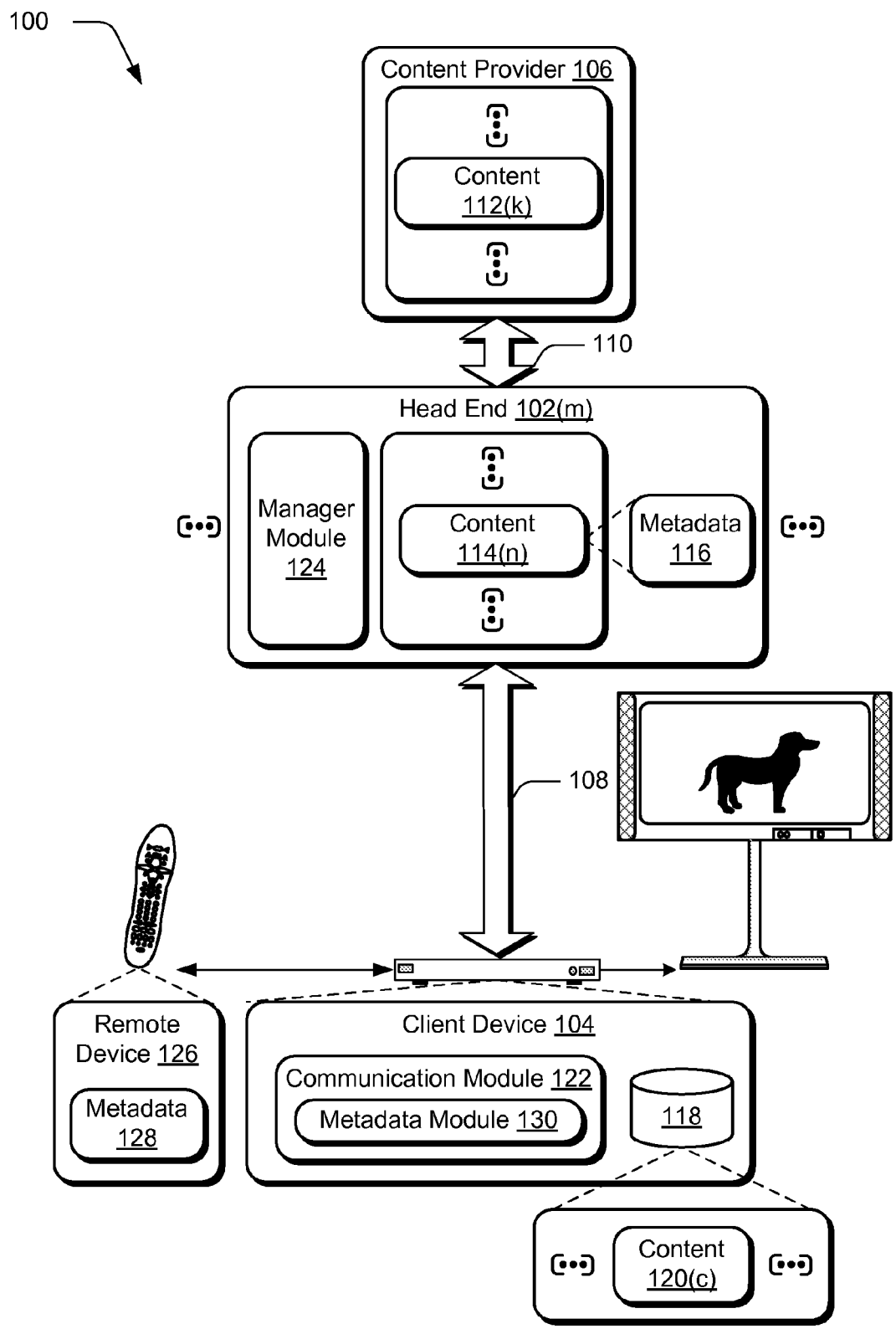
FIG. 1 illustrates an example of a suitable computing system environment.

FIG. 1 is an illustration of an environment 100 in an exemplary implementation that is operable to employ universal remote techniques to distribute metadata associated with displayed content. The illustrated environment 100 includes one or more head ends 102(m) (where "m" can be any integer from one to "M") of a network operator, a client device 104 and a content provider 106 that are communicatively coupled, one to another, via network connections 108, 110. In the following discussion, the head end 102(m) as well as the client device 104 and the content provider 106 may be representative of one or more entities. Therefore reference may be made to a single entity (e.g., the client device 104) or multiple entities (e.g., the client devices 104, the plurality of client devices 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client device 104 may be configured in a variety of ways. For example, the client device 104 may be configured as a computer that is capable of communicating over the network connection 108, such as a desktop computer, a mobile station, an entertainment appliance, a set-top box communicatively coupled to a display device as illustrated, a wireless phone, and so forth.

The content provider 106 includes one or more items of content 112(k), where "k" can be any integer from 1 to "K". The content 112(k) may include a variety of data, such as television programming, video-on-demand (VOD) files, and so on. The content 112(k) is communicated over the network connection 110 to the head end 102(m).

Content 112(k) communicated via the network connection 110 is received by the head end 102(m) and may be stored as one or more items of content 114(n), where "n" can be any integer from "1" to "N". The content 114(n) may be the same as or different from the content 112(k) received from the content provider 106. The content 114(n), for instance, may include additional data for broadcast to the client device 104.

One example of this additional data is illustrated in FIG. 1 as metadata 116. Metadata 116 may include a wide variety of data that is used to describe other data, which in this instance is content 114(n). The metadata 116 may be associated with the content 114(n) in a variety of ways, such as streamed with the content over the network connection 108. Thus, distribution of the content 114(n) (and consequently the metadata 116 in this example) from the head end 102(m) to the client device 104 may be accommodated in a number of ways, including cable, radio frequency (RF), microwave, digital subscriber line (DSL), satellite, via Internet Protocol (IP) connection, and so on. Although the metadata 116 is illustrated as being provided by the head end 102(m) for the sake of simplicity of the figure, it should be readily apparent that the metadata 116 may also originate from a wide variety of sources, such as a standalone third-party provider, the content provider 106, and so on.

The client device 104 may be configured in a variety of ways to receive the content 114(n) and the metadata 116 over the network connection 108. The client device 104 typically includes hardware and software to transport and decrypt content 114(n) and the metadata 116 received from the head end 102(m) for rendering by the illustrated display device. Although a display device is shown, a variety of other output devices are also contemplated, such as speakers.

The client device 104 may also include digital video recorder (DVR) functionality. For instance, the client device 104 may include memory 118 to record content 114(n) as content 120(c) (where "c" can be any integer from one to "C") received via the network connection 108 for output to and rendering by the display device. Thus, content 120(c) that is stored in the memory 118 of the client device 104 may be copies of the content 114(n) that was streamed from the head end 102(m).

The client device 104 includes a communication module 122 that is executable on the client device 104 to control content playback on the client device 104, such as through the use of one or more "command modes", i.e., "trick modes", to tune to a particular channel, order pay-per-view content, and so on. The command modes may provide non-linear playback of the content 120(c) (i.e., time shift the playback of the content 120(c)) such as pause, rewind, fast forward, slow motion playback, and the like.

The head end 102(m) is illustrated as including a manager module 124. The manager module 124 is representative of functionality to configure content 114(n) for output (e.g., streaming) over the network connection 108 to the client device 104. The manager module 124, for instance, may configure content 112(k) received from the content provider 106 to be suitable for transmission over the network connection 108, such as to "packetize" the content for distribution over the Internet, configuration for a particular broadcast channel, map the content 112(k) to particular channels, and so on.

Thus, in the environment 100 of FIG. 1, the content provider 106 may broadcast the content 112(k) over a network connection 110 to a multiplicity of network operators, an example of which is illustrated as head end 102(m). The head end 102(m) may then stream the content 114(n) over a network connection to a multitude of client devices, an example of which is illustrated as client device 104. The client device 104 may then store the content 114(n) in the memory 118 as content 120(c) and/or render the content 114(n) immediately for output as it is received, such as when the client device 104 is configured to include digital video recorder (DVR) functionality. In another example, the client device 104 may access streams of content from a plurality of head ends 102(m), further discussion of which may be found in relation to the following discussion.

The client device 104 is further illustrated as being communicatively coupled to a remote device 126 over a local network connection, such as a local wireless connection that may utilize radio frequency, infra red, and so on. The remote device 126 may be configured in a variety of ways, such as a device that extends functionality of the client device 104 and is targeted toward operation with that client device 104 and no other, such as a traditional television remote control that is provided with a television, and so on.

In another example, the remote device 126 may be configured for operation apart from the client device 104 as well as with the client device 104. The remote device 126, for instance, may be configured to include "stand alone" functionality, such as that exhibited by a wireless phone (e.g., a "smart" phone), personal digital assistant, portable game player, portable music player, and so on. In such an implementation, the remote device 126 may be configured for operation with a plurality of client devices 104. For example, a user of the remote device 126 may interact with a client device 104 at home and another client device at work, interact with yet another client device at a friend's home, and so on.

In an implementation, the remote device 126 may be bound to one or more client devices 104 to provide the interaction. For example, the client device 104 and/or the remote device 126 may include a "binding" button that, when selected, creates a local network connection between the remote and client device 126, 104. Further, this binding may be persisted such that when the remote device 126 is moved between client devices, the network connection is automatically created between the remote device 126 and the client device 106 without user intervention. For example, the binding information may be stored by the remote device 126 and/or the client device 104, remotely over a network connection (e.g., by the head end 102(m)), and so on. A variety of other examples are also contemplated.

As illustrated, the content 120(c) may be displayed on the display device. The content 120(c) may include any type or amount of content such as video or audio content as previously described. In addition, metadata 116 associated with the content 120(c) being displayed on the display device may also be presented. In the illustrated example, the metadata 128 is transmitted to the remote device 126 for display. As illustrated, the remote device 126 is remote from the display device of the client device 104. For example, the remote device 126 may be separate from the display device and located at one location while the display device may be located at a second location. In another example, the remote device 126 may be separate from the display device but may be located in proximity to the display device.

The metadata 128 may include data that describes the content 120(c) being displayed on the display device. For example, the metadata 128 may include information describing or characterizing objects being displayed in the content 120(c) on the display device or may include information on an audio track of the content 120(c). Additionally or alternatively, the metadata 128 may include other information pertaining to the content 120(c). As non-limiting examples to illustrate, the metadata 128 may include alternate audio tracks (e.g., dialog in foreign languages), subtitle information, product information such as item descriptions, pricing information or sales/marketing information, biographical information of people or characters portrayed in the content, and so on.

The client device 104 is further illustrated as including a metadata module 130 that is representative of functionality to interact with the metadata 128. For example, the metadata module 130 may separate the metadata 116 from the content 114(n) that is received via a stream from the head end 102(m). The metadata module 130 may also distribute the received metadata 116, such as to the remote device 126 as metadata 128. A variety of other examples are also contemplated, further discussion of which may be found in relation to FIG. 2.

It should be noted that one or more of the entities shown in FIG. 1 may be further divided (e.g., the head end 102(m) may be implemented by a plurality of servers in a distributed computing system), combined (e.g., the head end 102(m) may incorporate functionality to generate the metadata 116), and so on and thus the environment 100 of FIG. 1 is illustrative of one of a plurality of different environments that may employ the described techniques.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, such as the memory 118. The features of the techniques described herein are platform-independent, meaning that the techniques may be implemented on a variety of commercial computing platforms having a variety of processors.

Figure 2:
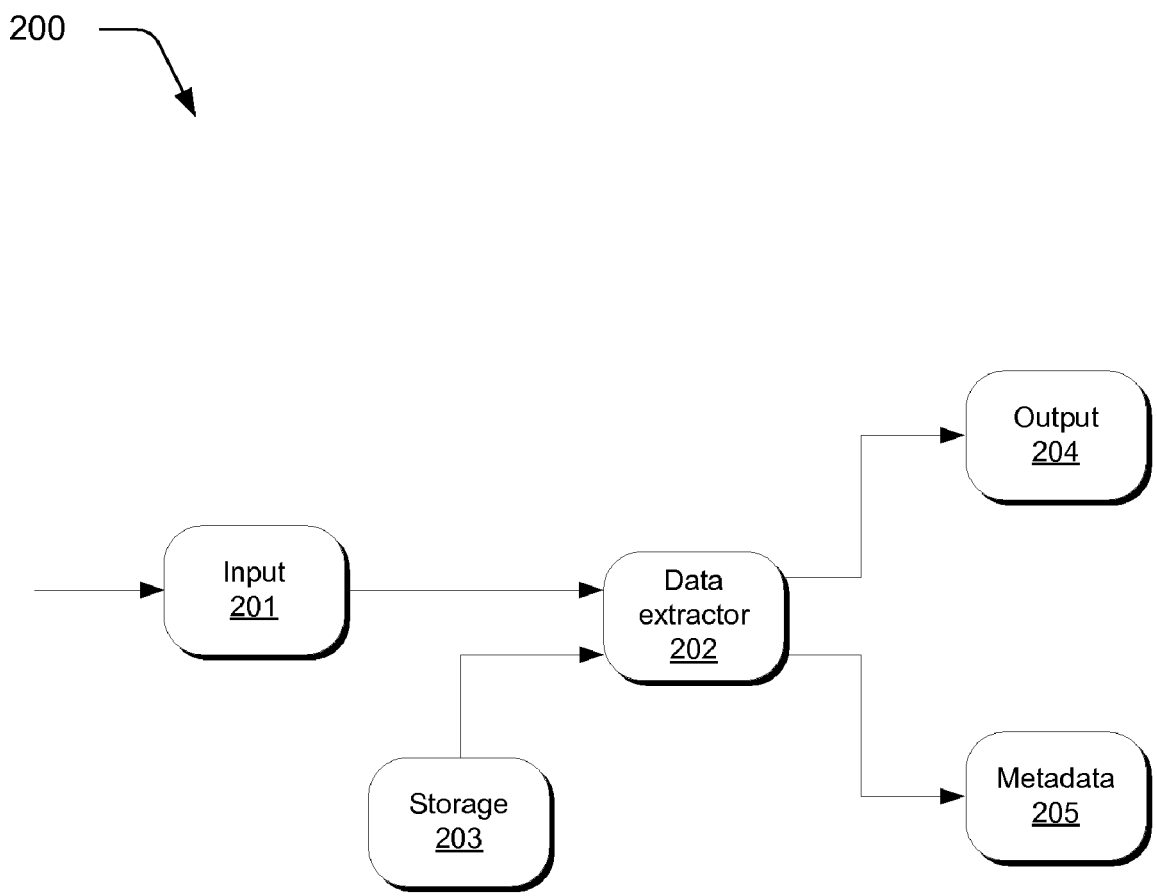
FIG. 2 illustrates an example of a system for providing content and metadata associated with the content.

FIG. 2 illustrates an example of a system 200 for providing content and metadata associated with the content. In this example, the system may include an input 201 for receiving information from a data source, a storage 203 for storing information such as user or device preferences or any other desired information, a data extractor 202 for identifying desired metadata data, an output 204 for providing the content to a user and/or a metadata output 205 for providing metadata to a remote device. FIG. 2 is merely one example for illustration purposes. Any of the components illustrated in FIG. 2 may be configured in different ways or omitted. Also, additional components may be present.

Figure 3:
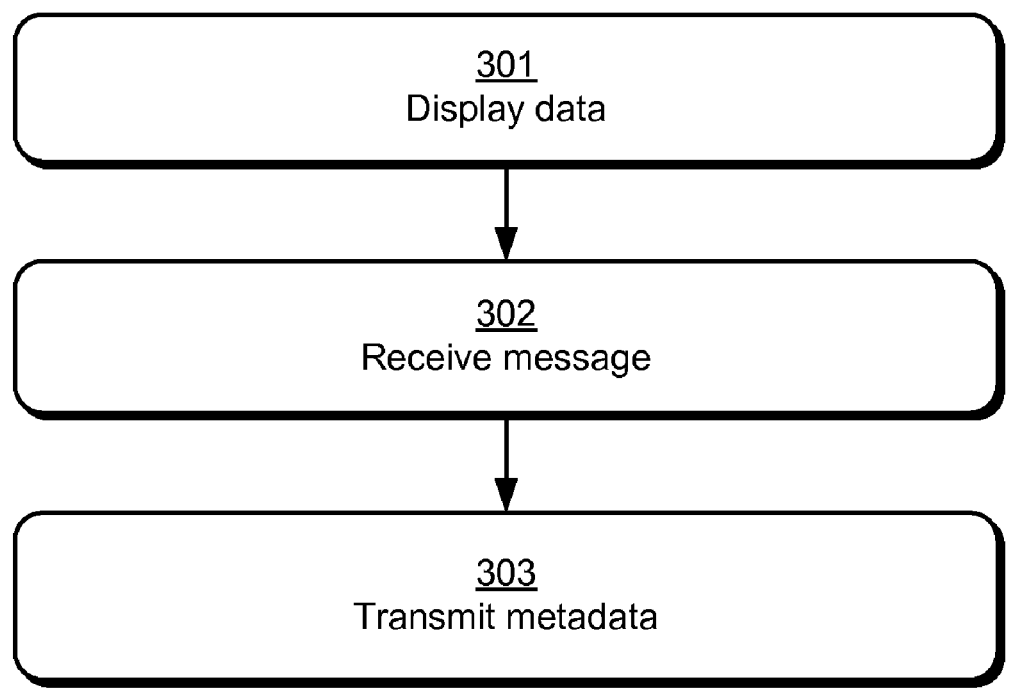
FIG. 3 is a flowchart illustrating one example of a process for providing metadata of content.

FIG. 3 is a flowchart illustrating one example of a process for providing metadata of content. In this example, content may be received (e.g., via input 201, FIG. 2) and may further be displayed for a user (block 301). The content may include a variety of forms of data including, for example, video and/or audio data. Video data may include images of objects, people, and so on. A user may wish to receive additional information on any of the objects depicted in the video data. In addition, the user may wish to obtain additional information on audio information presented in the content.

For example, the video data may include an output of a favorite actor. To obtain metadata 205 related to the actor, a user may select a button on the remote device 126 which causes a still image taken from the video data. Image recognition techniques (e.g., facial recognition) may then be used to identify all or a portion of the still image, e.g., the user may circle the actor's face to indicate a portion of the still image to be identified, the image recognition techniques may automatically recognize facial features without further user input, and so on. This identification may then be used as a basis for the metadata 205 that is obtained for and output by the remote device 126, further discussion of which may be found in relation to FIG. 4.

The system or device may further receive a signal or message from a user (block 302). A system receiving the input from the remote device may be the local client 104 or a server associated with the broadcast of the content currently on the client, such as a server used to implement the head end 102(m) of FIG. 1. Thus, the server may be part of the head end 102(m) or other video distribution network, have a relationship with that network, and so on. In a server embodiment, the remote device 126 transmits its interest in data presented on the client device 104 to the server, e.g., at the head end 102(m). The server then performs the processing to receive and respond to the request for information. In a local embodiment, the client device 104 interprets the request and either provides the response for more data from information stored locally at the client 104 or accesses a network such as the Internet or the head end 102(m) or other source to obtain the desired information. The signal or message may indicate desired information or metadata based on the content being displayed. The signal or message from the user may be received via the input 201 (FIG. 2) or via any other input device.

Based on the signal or message received from the user, the system or device may determine desired metadata and may further transmit the desired metadata to a user (block 303). For example, the content 114(n) may contain metadata 116 describing different aspects of the content 114(n). The metadata 116 may, for example, provide product information for objects displayed in the content 114(n) or biographical information on people or individuals depicted in the content. In this example, the data extractor 202 (FIG. 2) may receive the signal or message of the user via the input 201 (FIG. 2) and, based on the signal or message, identify the desired metadata 116 in the content 114(n). The data extractor 202 (FIG. 2) may further extract the desired metadata 116 from the content 114(n) and output the metadata via the metadata output 205 (FIG. 2). Content 114(n) may be provided via the output 204 (FIG. 2).

The metadata 116 provided via the metadata output 205 may include data that describes or characterizes an aspect of the content 114(n). For example, the metadata 116 may include information on objects displayed in the content 114(n). Continuing with the previous example, an object displayed in the content 114(n) may be selected by a user, e.g., by circling a still image as previously described, by capture of a still image as a "whole" and using image recognition techniques to determine a portion that is likely of interest to a user through execution of a module automatically and without user interaction, and so on. Based on the selection, metadata 116 corresponding to the selected object may be provided to the user. The type of metadata 116 provided may vary based on the type of object selected. For example, a user may select an object displayed in the content 114(n) to receive purchasing information for the object. In this case, the content 114(n)

may contain an image of an item that may be purchased. The user selects the object on the display and metadata 116 is transmitted to a remote device 126 of the user where the metadata 116 may describe various aspects of the object such as price, availability, and so on.

The metadata 116 may be provided to the user at a remote device 126. For example, the content 114(n) may be displayed on a display device of the client device 104 that is separate from the remote device 126. The user selects an object from the displayed content 114(n) on the display device (e.g., from a still image taken from the content output by the client device 104 as previously described) and the corresponding metadata may be transmitted to the remote device of the user, which is illustrated as metadata 128 with remote device 126. The remote device 126 of the user may be separate from the display device of the client device 104 as illustrated and may be located any distance from the display device, such as over a local area or wide area network. Hence, the display on the display device may be provided irrespective of metadata 128 being displayed on the remote device.

Figure 4:
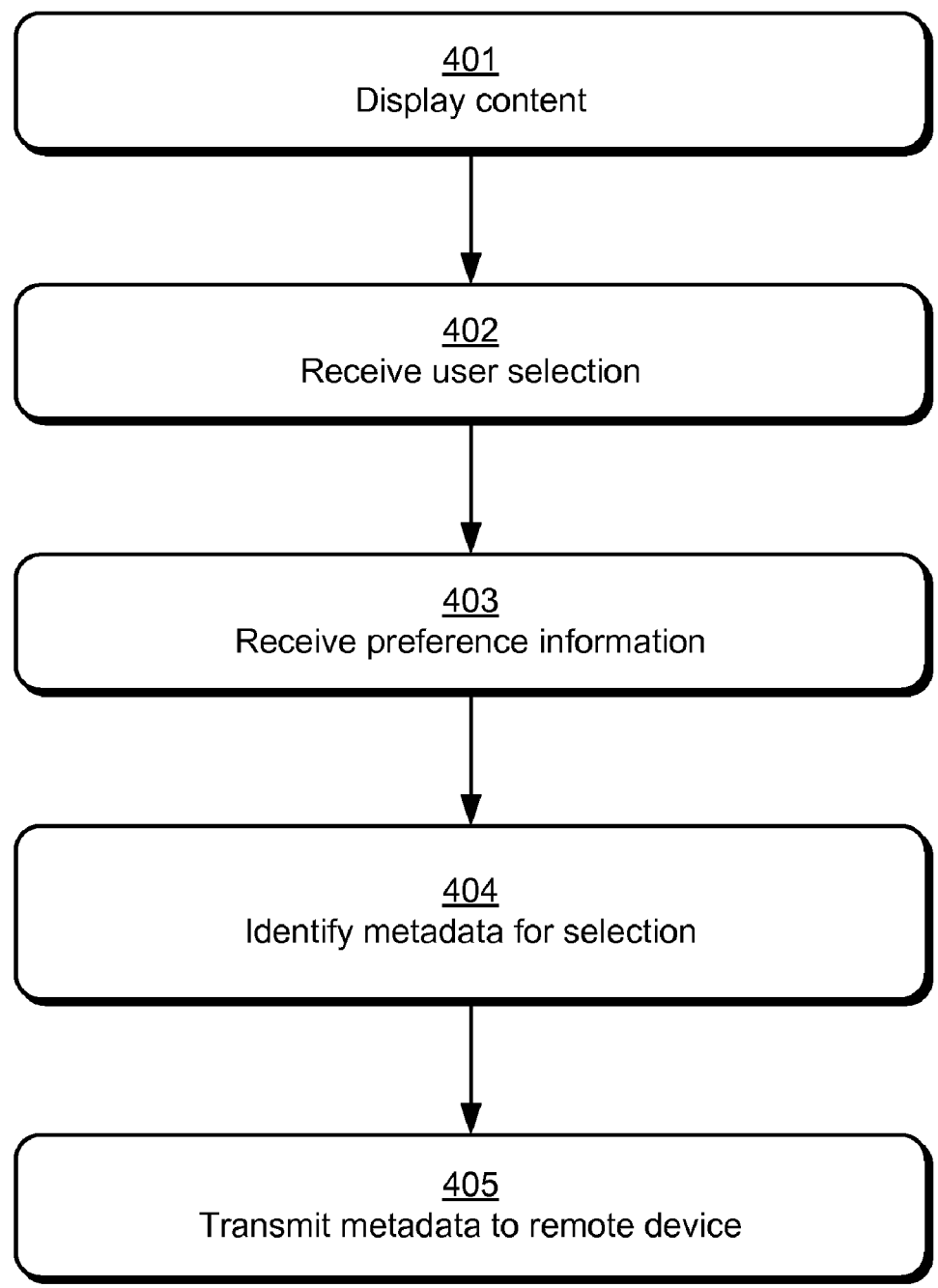
FIG. 4 is a flowchart illustrating an example for providing metadata of content to a remote device.

FIG. 4 is a flowchart illustrating an example 400 for providing metadata 116 of content 114(n) to the remote device 126. In this example, content 112(k) may be displayed on a display device (block 401) of the client device 104. Hence, the display device may display a variety of information, including video and/or audio information, e.g., audio content output via speakers of the client device 104. For example, if content 114(n) configured as video information is displayed on the display device of the client device 104, an object (e.g., actor's face, corporate logo, text, and so on) displayed as a portion of the video information may have associated metadata 116 that describes or further characterizes the object being displayed.

For instance, the content 114(n) may contain images of a particular television celebrity. However, a user may wish to receive biographical data, filmography, and so on of the television celebrity. In this instance, the user may select the image of the television celebrity on the display, such as to cause the client device 104 to store a still image which includes the television celebrity's face by interaction with a user interface output by the remote device 126. Responsive to the user selection of the television celebrity (e.g., by causing the still image to be captured and identifying a portion of the still image that includes the television celebrity's face after the still image is transferred to the remote device 126), metadata 116 describing the television celebrity may be transmitted to a remote device 126 of the user. The user may then interact with the metadata 116 on the remote device 126, such as to view the biographical data.

As previously described, the remote device 126 may be configured as a variety of devices that receives data and is separate from the display device of the client device 104 that displays the content 114(n). For example, the remote device 126 may include a phone, music player, remote control device, and so on. In this case, other viewers of the display device of the client device 104 are not distracted by the metadata 116, e.g., the output of the metadata 116 by the remote device 126 does not interfere with the output of the content 114(n) by the client device 104.

In another example, metadata 116 may be automatically transmitted to the remote device 126 based on preferences of a user or a remote device 126. In this case, a storage 203 (FIG. 2) may be included for storing user or remote device 126 preferences. The preferences may be received and read by a data extractor 202 (FIG. 2) (block 403, FIG. 4) to determine metadata 128 to be transmitted to a remote device 126 of the user (block 404, FIG. 4). Metadata 116 corresponding to the content may be provided from a data source, an example of which is the head end 102(m) of FIG. 1. In this example, the data source (e.g., the head end 102(m)) may provide the content 114(n) and metadata 116 via an input (201, FIG. 2) to a data extractor (202, FIG. 2). The data extractor 202 may further receive preference information from a user or may store the preference information from the user and/or the remote device 126 in storage 203. Based on corresponding preference information, the data extractor 202 may identify metadata 116 that correspond to the content 114(n) and transmit the identified metadata 116 to the remote device 126 (block 405), which is illustrated as metadata 128. Thus, the remote device 126 may correspond to the user and may include a variety of types of remote devices. In one example, the remote device 126 includes a display and/or a speaker such that the remote device 126 may display or present the metadata to the user.

As one example, a user may wish to receive a particular type of data on the remote device 126. For instance, the user may wish to receive news updates on the remote device 126 when configured as a wireless phone. In this instance, the user may send a preference to indicate the desire to receive such information at regular intervals. The preference may be stored and accessed when the desired information is received. When content 114(n) is received from a data source such as a news agency providing news updates, the system may retrieve user preferences from storage and may identify metadata 116 within the content 114(n) from the data source. The identified metadata 116 (e.g., news updates) may be transmitted to the remote device 126 (i.e., wireless phone in this example), which is illustrated as metadata 128 in FIG. 1.

In an implementation, the metadata 126 obtained for output by the remote device 126 may be synchronized with particular points in time in an output of the content 114(n) by the client device. For example, a user of a remote device 126 may have missed a last play of a sporting event output in content 114(n) that is displayed in the display device of the client device 104. Accordingly, a user of the remote device 126 may initiate an operation which determine a particular point in time in an output of the content 114(n) at the client device 104, such as to determine a current timestamp in the connect, current "offset" (e.g., third quarter, 12 seconds remaining), and so on.

This information may then be communicated from the client device 104 to the remote device 126, which may then be used by the remote device 126 to obtain metadata 128 that pertains to a desired point in time. Continuing with the previous example, the remote device 126 may use the determination of the particular point in time in the output of the content 114(n) to "rewind" a display of the content on the remote device 126 to locate the desired play. Thus, the operation of the remote device 126 and the client device 104 may be synchronized, one with another. In one embodiment, the client device 104 has random access memory capability and is capable of streaming multiple streams of video regarding the current video, and streams the requested video to the remote device 126 for display without interrupting the current broadcast of the video at the client device 104. Other technologies for enabling simultaneous streaming of video from a single source may be used. In a further embodiment, a client device 104 is continuously broadcasting the content to the remote device 126, which is then buffered. This embodiment enables a fast and responsive display in response to the user's request to rewind or otherwise move around in the video. In yet another embodiment, the remote device 126 sends the metadata information to the server, e.g., a server at the head end 102(m). The server then identifies the correct segment of content 114(n) and transmits the content 144(n) directly to the remote device 126. This embodiment has the advantage of lessening the processing burden on the client device 104. A variety of other examples are also contemplated.

Figure 5:
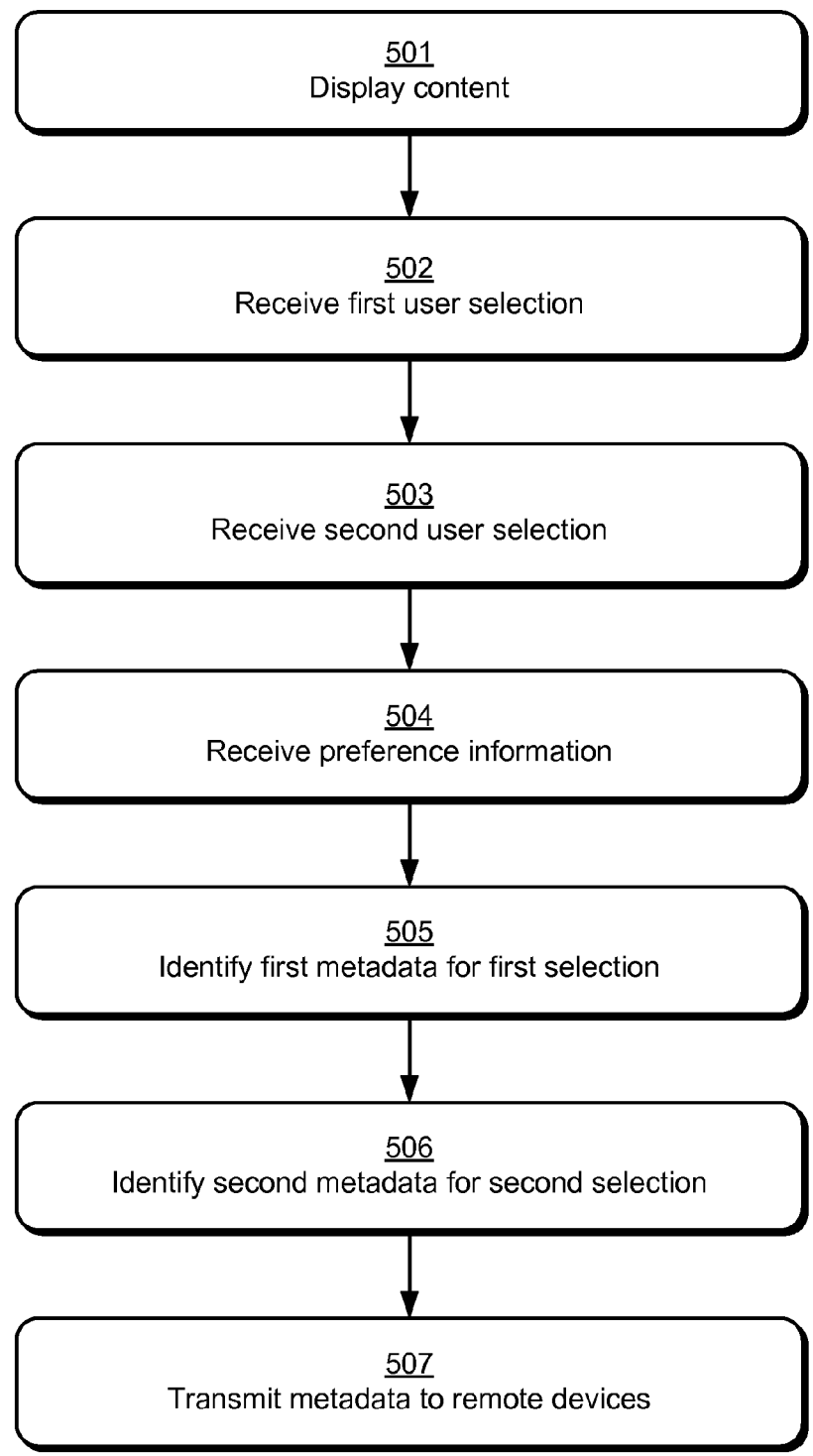
FIG. 5 is a flowchart illustrating another example of processing requests for metadata.

In another example, a number of requests from a number of users may be received and processed. FIG. 5 is a flowchart 500 illustrating another example of processing requests for metadata. In this example, content 114(n) is displayed (block 501) on a display device of the client device 104 for a user. The content 114(n) may contain metadata 116 that is not displayed with the content 114(n) on the display device of the client device 104. A variety of numbers or types of metadata 116 pertaining to the content 114(n) may be included. For example, the metadata 116 may include alternate language tracks, purchasing information for objects displayed in the content 114(n), descriptive data for objects or persons displayed, descriptive information for additional material such as sound or music being provided in the content 114(n), subtitling information in different languages, and so on. These are merely examples as any type of metadata 114(n) may be included and a variety of other examples are also contemplated without departing from the spirit and scope thereof.

A first user selection is received (block 502). The first user selection may include a selection of an item or object displayed on the display device of the client device 104 as previously described. For example, a user may select an object being displayed to receive additional information on the object, either on the display device of the client device 104 and/or on a display device of the remote device 126. A second user selection is received (block 503). The second user selection may be from the same user inputting the first user selection or a different user. For example, a first user may select an object displayed or presented in the content 114(n) and may also select another object displayed or presented in the content 114(n) concurrently or at a later point in time. Alternatively, a first user may select an object displayed or presented in the content 114(n) while a second user, different from the first user, may select the object or another object displayed or presented in the content 114(n).

Metadata 116 corresponding to the first selection and the second selection is identified (block 505 and block 506). The identification of the metadata 116 for each of the first and second selections may be performed based on a number of factors. In one example, as illustrated in FIG. 5, the metadata may be identified based on preference data (block 504). In this example, preference data may be received (block 504) from a storage or from a user or remote device 126, e.g., input through a user interface output by the client device 104 and/or remote device 126. The preference data may describe desired information. For example, the preference data may indicate that a user desires to receive stock quote information at specified intervals. In this case, metadata 116 pertaining to the desired stock quote information may be extracted from the content 114(n) and may be presented to the user.

In this example, a user may request information on different objects such that metadata 116 for each of the objects is provided on a remote device 126 for the user. For example, the user may select a first object (block 502) and a second object (block 503) and receive first metadata corresponding to the first object (block 505) and second metadata describing the second object (block 506). Alternatively, different users may request information on any objects such that metadata for each of the objects selected is provided on remote device 126 for the different users.

For example, a first user may select a first object (block 502) while a second user may select an object (block 503). The object selected by the second user may be the same object or a different object from the object selected by the first user. Metadata 116 may be identified for each of the selections (blocks 505, 506)—in this case, first metadata may be identified for the first selection by the first user (block 505) and second metadata may be identified for the second selection by the second user (block 506).

If the first user and the second user select the same object, then the first metadata and the second metadata may be substantially the same if both the first user and the second user desire the same information. Alternatively, the first user and the second user may select the same object but may desire different information on the same object. In this case, the first metadata and the second metadata may be different. For example, a user interface may be output upon selection of a portion of an image that provides options for metadata associated with the portion, such as for an actor the metadata may be divided by type such as biographical information, future airings of television programs related to the actor, and so on.

Based on the selections from the different users, first metadata may be transmitted to the first user (block 507) while second metadata may be transmitted to the second user (block 507). As described above, the first and second metadata may be similar or different.

Continuing with the previous example, a first user may desire a replay of a program being displayed on a display of the client device 104 and a second user may desire subtitles for the program being displayed by the client device 104. The first user may request a replay of the program and the program may replay on a first remote device corresponding to the first user responsive to the request. The second user may request the desired subtitles and the subtitles may be displayed on a second remote device corresponding to the second user. In this way, the first user may receive information on a remote device of relevance to the first user while the second user may receive information desired by the second user on a remote device. Neither the first user nor the second user receives information that is not requested by the respective users. For example, the first user does not receive subtitle information and the second user does not receive a replay of the program.

In another example, a user may transmit content (e.g., via a website) and the transmitted content may be sent to any number of other users. For example, content may be received from a user. The received content may contain any information including audio and/or video data. The received content may also be displayed on a display device of the remote device that corresponds to any other user. For example, a display device of the remote device 126 may display the content received from the user to other users. Alternatively, the display device may display other content (e.g., a television program) while transmitting the content received from the user to other users via other remote devices corresponding to each receiving user. A variety of other examples are also contemplated.

Figure 6:
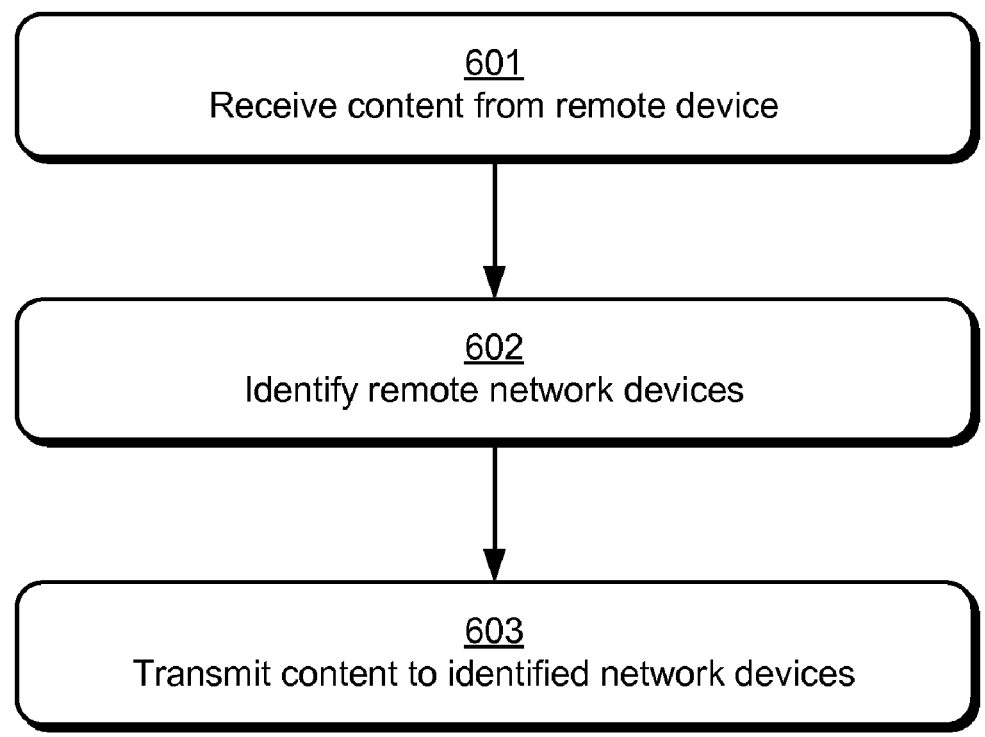
FIG. 6 is a flowchart illustrating an example of transmitting user content to a remote device.

FIG. 6 is a flowchart illustrating an example 600 of transmitting user content to a remote device. Content may be presented or displayed for a number of users via a display device. The users may have a corresponding remote device capable of receiving and/or sending content. A first user may have content on his/her remote device that is not initially available to other users and not being displayed on the display device. The first user may transmit the content on his/her remote device to the service (block 601). Other remote network devices may be identified to receive the content from the first user (block 602) and the content from the first user may be transmitted from the first user to the identified other users via remote devices of the other users (block 603). For example, other users or other remote devices to receive the content from the first user or first remote device may be identified by subscription information or preference information for the first user or for the other users. Alternatively, users or remote devices may be identified by the first user in which the first user may specify at least one other remote user to receive the content.

Also, the display device may not display the content received from the first user. Rather, each of the other users that receive the content from the first user via the service may receive the content while the display device of the service does not display the content from the first user.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the description.

What is claimed is:

1. A method comprising at a client device:
receiving content in a broadcast;
identifying a request received from a remote device to capture a still image from the content in the broadcast;
capturing the still image from the content in the broadcast in response to the request from the remote device;
transmitting the still image for receipt and display by the remote device;
receiving from the remote device image data comprising a portion of the still image displayed at the remote device, the portion of the still image selected by a user via a user interface output at the remote device and including at least one object to be identified;
transmitting the portion of the still image for receipt by one or more servers to identify metadata that is relevant to the request by processing the portion of the still image using image recognition to identify the at least one object;
receiving the identified metadata from the one or more servers, the identified metadata associated with the at least one object in the portion of the still image; and
outputting the received metadata for the remote device to display the received metadata.

2. A method as described in claim 1, wherein the identifying is performed in real time as the content is received.

3. A method as described in claim 1, further comprising storing the content in storage at the client device, wherein the identifying and the outputting are performed as the content is stored.

4. A method as described in claim 1, further comprising storing the content in storage at the client device, wherein the identifying is performed as the content is output from the storage.

5. A method as described in claim 1, wherein the remote device is communicatively coupled to the client device to cause the client device to implement one or more functions that are local to the client device.

6. A method as described in claim 1, wherein the content is streamed to the client device from one or more servers of a head end of a network operator.

7. A method as described in claim 1, wherein the identifying is performed for a plurality of said remote devices such that each said remote device receives said metadata that is particular to respective preferences.

8. A method comprising at a remote device:
creating a persistent network connection between the remote device and a client device;
forming a request to cause a still image to be captured by the client device from content output in a broadcast at the client device and transmitted to the remote device for display;
displaying, at the remote device, the still image received from the client device;
receiving a user input, via a user interface output at the remote device, that selects a portion of the still image displayed at the remote device, the portion of the still image including one or more objects to be identified;
transmitting image data comprising the portion of the still image from the remote device for receipt by the client device to obtain metadata associated with the one or more objects in the portion of the still image from one or more servers configured to process the portion of the still image using image recognition to identify the one or more objects in the still image;
receiving the metadata from the one or more servers;
displaying the metadata that corresponds to the one or more objects in the still image; and
transmitting the metadata for display at another remote device that corresponds to another user and is configured to communicate with the client device.

9. A method as described in claim 8, wherein the network connection between the remote device and the client device is persistent such that the network connection between the remote device and the client device is automatically created without user intervention.

10. A method as described in claim 8, wherein:
the creating is performed for a plurality of said client devices; and
the network connection is persistent such that the network connection between the remote device and each said client device is automatically created.

11. A method as described in claim 8, wherein the remote device is configured to cause the client device to implement one or more functions that are local to the client device.

12. A method as described in claim 8, wherein:
the content and the metadata are streamed to the client device from a head end of a network operator; and
the remote device receives the metadata via the client device.

13. A method as described in claim 8, wherein:
the content is streamed to the client device from a head end of a network operator; and
the metadata is streamed directly to remote device without being streamed to the client device.

14. A method as described in claim 8, wherein the request identifies at least a portion of the content output by the client device.

15. A method comprising at a remote device:
displaying, at the remote device, an image captured by a client device from video data displayed on the client device;
receiving a user input that selects a portion of the image to be used with image recognition to obtain metadata associated with one or more objects in the portion of the image, the user input received in response to a user circling the one or more objects in the portion of the image via a user interface output by the remote device;
transmitting the portion of the image and not the still image as a whole from the remote device for receipt by the client device to identify the metadata associated with the one or more objects in the portion of the image;

displaying the metadata on a display screen integrated with the remote device to enable user interaction with the metadata.

16. The method as described in claim 15, wherein the metadata displayed by the remote device comprises metadata based on one of remote device preferences or user preferences.

17. The method as described in claim 15, further comprising causing the client device to capture a still image from the video data being displayed and transmit the still image to the remote device without interrupting a current broadcast of the video data at the client device.

18. The method as described in claim 15, wherein the remote device and the client device are located in a same room.

19. The method as described in claim 15, further comprising receiving a user selection of the portion of the image, wherein the one or more objects in the portion include a face of an actor and the image recognition includes facial recognition used to identify the actor for obtaining metadata associated with the actor.

20. The method as described in claim 15, further comprising:
causing the portion of the image to be transmitted for receipt by one or more servers for the image recognition and identification of the one or more objects; and
receiving the metadata associated with the one or more objects for display on the display screen.

21. A method comprising at a server:
receiving via a network a portion of a still image captured from a broadcast of content at a client device, the still image captured by the client device in response to a request from a remote device that is remote from the client device, the still image transmitted to the remote device for display at the remote device to enable user selection of the portion of the still image via a user interface output at the remote device, the portion of the still image, and not the still image as a whole, transmitted from the remote device to the client device for transmission to the server via the network;
processing the portion of the still image using image recognition to identify one or more objects in the portion of the still image;
locating metadata that corresponds to the identified one or more objects; and
transmitting the located metadata via the network for receipt by the client device.

22. The method as described in claim 21, wherein the transmitting is performed by streaming the located metadata to the client device.

23. The method as described in claim 21, wherein the transmitting is performed by streaming the located metadata directly to a remote device without streaming the metadata to the client device, the remote device being communicatively coupled to the client device and having caused the still image to be captured.

24. The method as described in claim 21, wherein the server is a component of a head end of a network operator.

25. The method as described in claim 21, wherein the located metadata comprises metadata based on one of user preferences or remote device preferences of a remote device communicatively coupled to the client device.

26. The method as described in claim 21, wherein the one or more objects include a face of an actor and the image recognition includes facial recognition used to identify the actor and obtain corresponding metadata that is associated with the actor.

27. The method as described in claim 21, wherein the still image is captured from a current broadcast of the content at the client device without interrupting the current broadcast.

* * * * *